United States Patent [19]
Le Fol et al.

[11] Patent Number: 5,297,769
[45] Date of Patent: Mar. 29, 1994

[54] HYDROELASTIC SUPPORT ESPECIALLY FOR THE SUSPENSION OF A MOTOR VEHICLE ENGINE

[75] Inventors: Marcel Le Fol, Domloup; Pascal Robic, Rennes, both of France

[73] Assignees: Automobiles Peugeot, Paris; Automobiles Citroen, Neuilly Sur Seine, both of France

[21] Appl. No.: 54,243

[22] Filed: Apr. 30, 1993

[30] Foreign Application Priority Data

May 7, 1992 [FR] France ................. 92 05655

[51] Int. Cl.$^5$ ........................... F16M 13/00
[52] U.S. Cl. ..................... 248/550; 248/562; 248/636; 248/638; 248/659; 267/140.11; 267/140.13; 267/140.14
[58] Field of Search ........... 248/550, 562, 638, 636, 248/659; 267/140.11, 140.13, 140.14, 140.15; 123/192.1

[56] References Cited

U.S. PATENT DOCUMENTS

| | | | |
|---|---|---|---|
| 4,648,576 | 3/1987 | Matsui | 248/550 |
| 4,650,170 | 3/1987 | Fukushima | 267/140.15 X |
| 4,671,227 | 6/1987 | Hollerweger | 123/192.1 |
| 4,687,171 | 8/1987 | Freudenberg | 248/638 X |
| 4,700,933 | 10/1987 | Chikamori | 267/140.11 |
| 4,730,584 | 3/1988 | Jordens | 248/550 X |
| 5,238,232 | 8/1993 | Kobayashi | 267/140.14 |
| 5,242,158 | 9/1993 | Robic | 267/140.11 |

FOREIGN PATENT DOCUMENTS

| | | |
|---|---|---|
| 2737985 | 3/1978 | Fed. Rep. of Germany . |
| 2507976 | 12/1982 | France . |
| 2634530 | 1/1990 | France ............ 267/140.11 |
| 2670261 | 6/1992 | France . |

OTHER PUBLICATIONS

F. D. Jones (Ed.), "Ingenious Mechanisms for Designers and Inventors," 1930, *The Industrial Press*, New York, USA, pp. 3–6.

*Primary Examiner*—J. Franklin Foss
*Attorney, Agent, or Firm*—Burns, Doane, Swecker & Mathis

[57] ABSTRACT

The invention proposes a hydroelastic support (10) intended to be interposed between two assemblies to be suspended one with regards to the other, of the type comprising two armatures (12, 14) joined together by a block of elastomer material (16), a working chamber (26) and an expansion chamber (33), connected together by a communication passage (34), and of the type in which the working chamber (26) is delimited in part by a movable diaphragm (30) whose external face (42) comprises a push-rod (44) with which there cooperates a device of the connecting-rod (50) and crank (62, 66) type for driving the movable diaphragm, in which the small end (54) of the connecting-rod (50) is connected to the push-rod (44) and in which the shaft (66) for driving the crank (62) in rotation is mounted so as to turn in a bearing (70) fixed to one (12) of the two armatures.

15 Claims, 4 Drawing Sheets

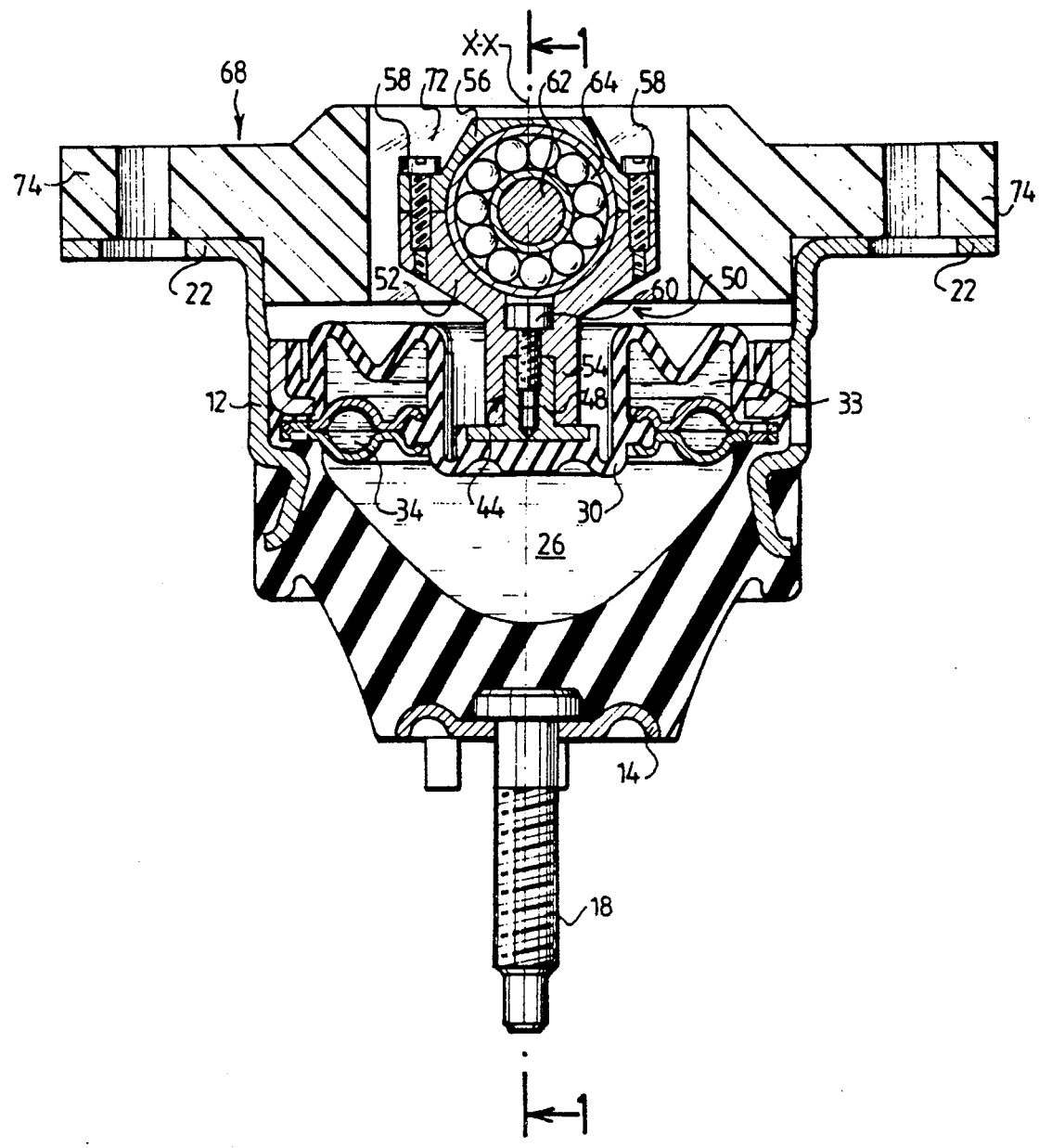
FIG·2

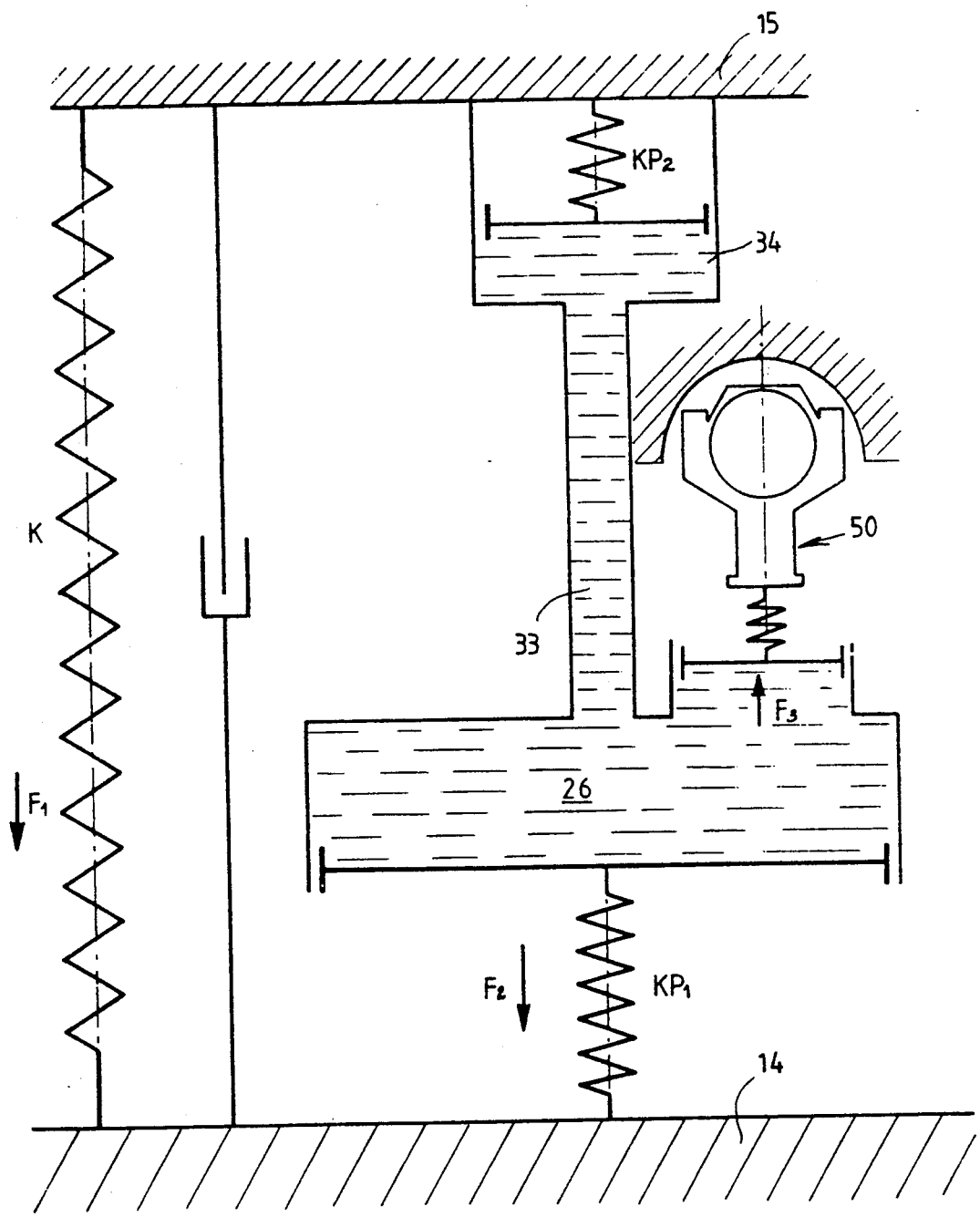

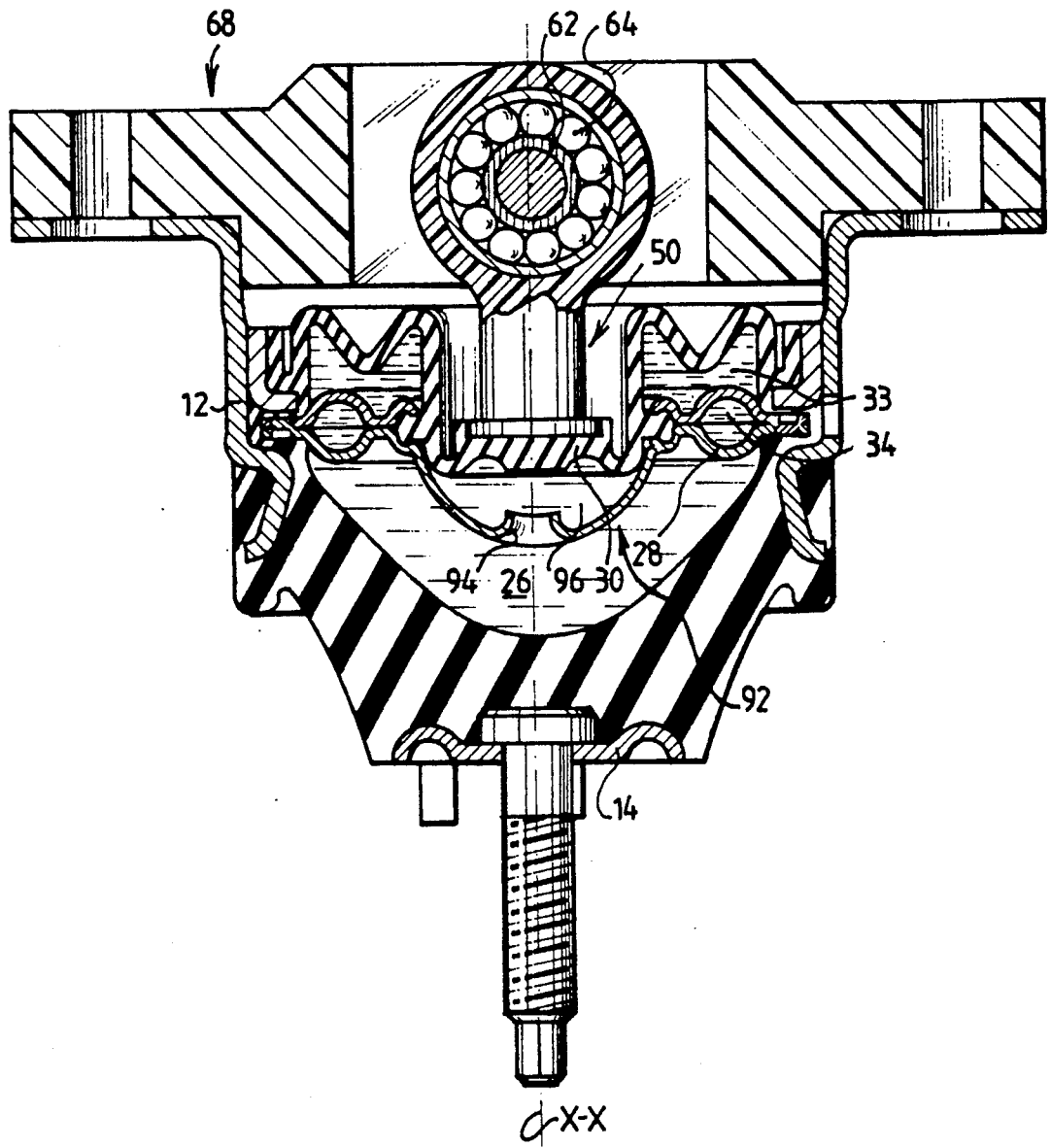
FIG·4

HYDROELASTIC SUPPORT ESPECIALLY FOR THE SUSPENSION OF A MOTOR VEHICLE ENGINE

The present invention relates to a hydroelastic support intended to be interposed between two assemblies to be suspended one with regard to the other.

The invention relates especially to a support for the suspension of an engine in a motor vehicle.

Document FR-A-2,364,373 describes and illustrates a hydroelastic support of the type comprising two armatures connected respectively to the two assemblies to be suspended, these two armatures being joined by a block of elastomer material, the support comprising at least one working chamber and one expansion chamber, these two chambers being filled at least partially with liquid and connected together by a communication passage, and of the type in which the working chamber is delimited in part by a movable diaphragm in elastic material whose external face comprises a push-rod with which a cam of a drive device of the movable diaphragm cooperates in order to apply to the latter displacements controlled in such a way as to create in the working chamber pressure forces synchronous with the harmonics of the vibrations of one of the two assemblies to be isolated such as, for example, a rotating machine or an internal combustion engine. The displacements to which the push-rod is subjected are, for example, alternating displacements with a frequency and a phase which are equal to those of the imbalance to be filtered.

The arrangement described and illustrated in this document is of particularly complex design, this document not, moreover, proposing any industrially practicable solution permitting the mounting in a simple manner of such a type of hydroelastic support between the body of a motor vehicle and the power plant while ensuring the rotational drive to the excitation cam for the movable diaphragm.

In order to overcome these drawbacks, there has already been proposed in the French Patent Application No. 90 15439 that provision be made for the shaft for driving the cam in rotation to be mounted so as to turn in a bearing fixed to one of the two armatures of the hydroelastic support. This solution is not entirely satisfactory insofar that the members which apply an alternating movement to the movable diaphragm are capable of becoming separated one from the other and thereby of giving rise to a delay between the input signal and the corrective action on the hydroelastic support.

Document FR-A-2,507,976 moreover discloses how to actuate an elastic support using a connecting-rod which is connected to the power plant of the vehicle by an eccentric. In this document, the eccentric is located on the extremity of the crankshaft of the power plant and it acts on a vertical connecting-rod which is connected to the power plant, that is to say the latter hangs under the hydroelastic support.

Aside from the fact that the transmission connecting-rod is long and therefore of significant mass, it is noted that this arrangement also has the drawback of not being able to separate the supporting function of the support from its filtering-valve function. Finally, this arrangement has the drawback of permanently applying to the eccentric the mass of the power plant and of making it necessary to produce a very rigid valve. This drawback was also inherent to the structure of the hydroelastic support illustrated in the French Patent Application No. 90 15439 in which the movable diaphragm must be sufficiently rigid to confer upon it a return-spring function in order to hold the follower in contact with the cam.

In order to overcome these drawbacks, the invention proposes a hydroelastic support of the previously mentioned type, characterised in that the drive device of the movable diaphragm is of the connecting-rod and crank type in which the small end of the connecting-rod is connected to the push-rod and in which the shaft for driving the crank in rotation is mounted so as to turn in a bearing fixed to one of the two armatures of the hydroelastic support.

According to other characteristics of the invention:

the crank comprises an eccentric crank pin mounted rotationally in the big end of the connecting-rod;

the push-rod may be fixed to the free extremity of the small end of the connecting-rod or produced integrally with the latter;

the big end of the connecting-rod is produced in two parts;

the connecting-rod is produced as a single component by casting;

one extremity of the shaft for driving the crank in rotation comprises positive location means permitting its angular position to be determined for the purpose of connecting the driveshaft;

the armature is an armature of generally cylindrical form of which a first axial extremity is connected to the block of elastomer material and of which the second axial extremity receives a closing cover in which the bearing for the driveshaft of the crank is arranged;

the second axial extremity of the cylindrical armature comprises a flange for fixing the support to the said assembly, the cover comprising a radial flange arranged facing the flange of the armature against which it is axially clamped;

the expansion chamber is of generally annular form and delimits an internal housing in which the push-rod is arranged;

the movable diaphragm has substantially the form of a disc connected to the armature by its outer peripheral edge;

the peripheral edge of the movable diaphragm is mounted clamped in a sealed manner between the facing internal circular edges of two rigid annular plates;

the annular plate arranged axially on the side facing the block of elastomer material comprises a part which, in cross-section, has a profile of revolution and which extends from its internal circular edge towards the inside of the working chamber and which comprises at least one calibrated passage orifice for the liquid.

the part of revolution comprises a calibrated central orifice.

Other characteristics and advantages of the invention will become clear on reading the detailed description which follows for an understanding of which reference will be made to the attached drawings in which:

FIG. 2 is an axial view in section along the line 2—2 of FIG. 1;

FIG. 3 is an equivalent diagram permitting an illustration of the mode of operation of the support represented at FIGS. 1 and 2; and FIG. 4 is a view in axial cross-section similar to the one of FIG. 2 illustrating an embodiment variant of the hydroelastic support.

Figure 1:
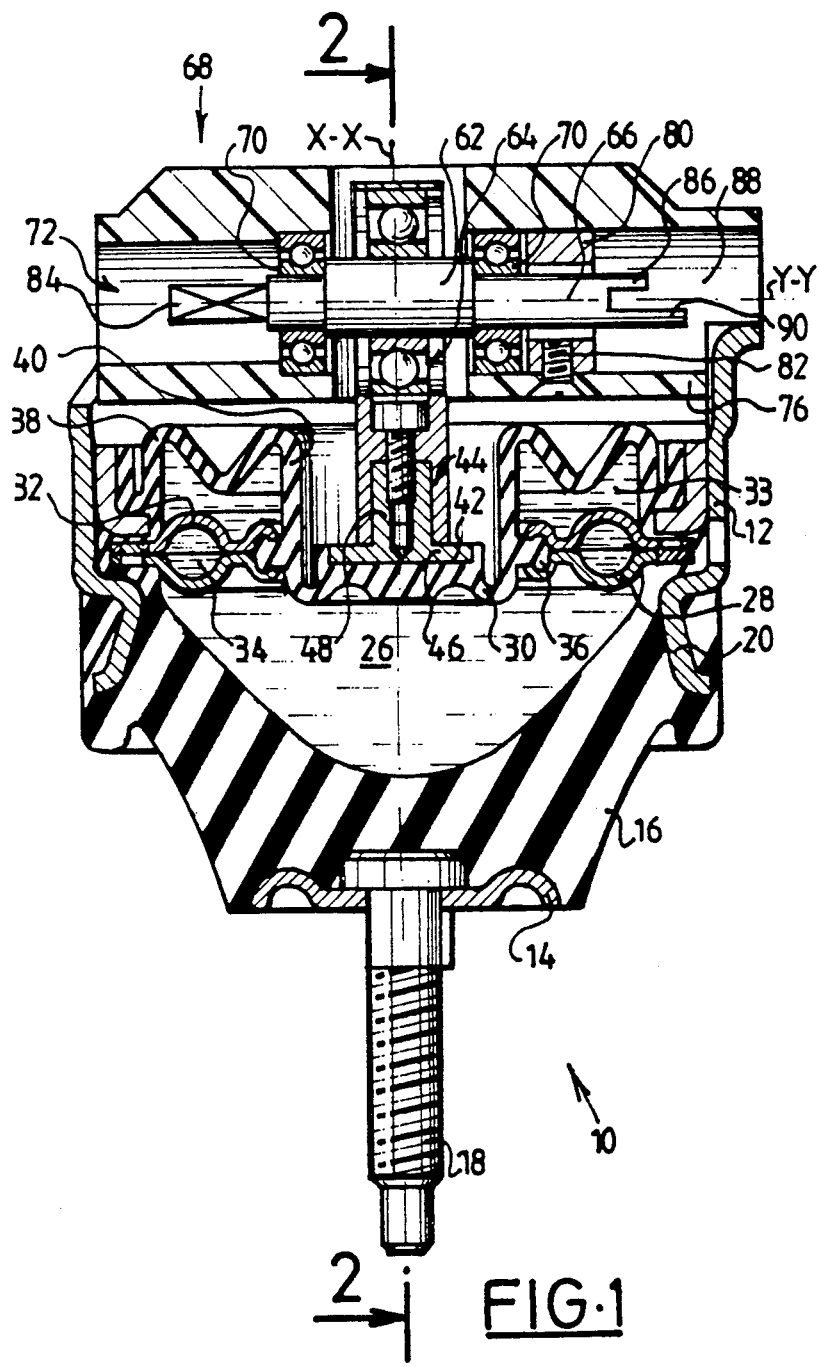
FIG. 1 is a view in axial section along the line 1—1 of FIG. 2 of a hydroelastic support made in accordance with the teachings of the invention.

The support 10 illustrated in the figures consists of a first armature of generally cylindrical form 12 and a second armature 14 which are connected together by a block of elastomer material 16.

The armature 12 is provided in order to be connected to a part, not shown, of the power plant of a motor vehicle while the second armature 14 is provided in order to be connected to a part of the structure of the vehicle by means of a threaded link 18.

The first armature 12 has a generally cylindrical form with an axis X—X.

The first axial extremity 20 of the armature 12 is set into the elastomer material of the block 16.

The opposite second axial extremity 22 of the armature 12 is a flange which extends in a radial plane perpendicular to the axis X—X and which permits the fixing of the armature 12 to a portion of a power plant.

The block of elastomer material 16 partly delimits a working chamber 26 at its lower part when looking at the figures.

The chamber 26 is also delimited by an intermediate rigid plate 28 of generally annular form and by an elastically deformable movable diaphragm 30 which is capable of being displaced substantially along the direction X—X.

The plate 28 cooperates with a symmetrical plate 32 to define between them a passageway 34 which, according to a known technique, connects the working chamber 26 with an expansion chamber 33.

The peripheral edge 36 of the movable diaphragm 30 in the form of a disc is produced in the form of a bead which is mounted clamped in a sealed manner between the facing internal circular edges of the two rigid annular plates 28 and 32.

The chambers 26 and 33 are filled with liquid.

The expansion chamber 33 is delimited on the one hand by the upper face of the annular plate 32 and on the other hand by a portion of elastically deformable membrane 38 integral with the movable diaphragm 30.

For this purpose, the elastically deformable membrane 38 comprises a cylindrical linking portion 40 which axially extends the movable diaphragm 30, the bead 36 being formed on the outer cylindrical wall of the linking portion.

The upper face 42 of the movable diaphragm sited outside the working chamber 26 comprises an actuating push-rod 44 which allows forces in the direction X—X to be applied to the movable diaphragm 30.

The push-rod 44 comprises a plate 46 which extends along a plane virtually perpendicular to the axis X—X and which is bonded to the upper face 42 of the movable diaphragm 30.

The push-rod 44 comprises an axial extension 48 which is connected to an actuating connecting-rod 50 which forms part of an actuation device of the connecting-rod and crank type which will now be described in detail.

In the embodiment illustrated in FIGS. 1 and 2, the big end of the connecting-rod 50 is produced in two parts.

A first part 52 extends the small end of the connecting-rod 54 and it is finished off using a connecting-rod cap 56 which fixed to it by screws 58.

The cylindrical portion 48 of the push-rod 44 is fixed to the free extremity of the small end 54 of the connecting-rod 50 by means of a screw 60 whose head is accessible from the internal semicylindrical face of the first part 52 of the big end of the connecting-rod 50.

The big end of the connecting-rod 50 is mounted clamped onto a ball- or needle-bearing 64, in which an eccentric crank pin 62 is rotationally received.

The crank pin 62 is produced integrally with its driveshaft 66 so as to constitute a crank whose axis of rotation Y—Y is substantially perpendicular to the axis X—X of the hydroelastic support 10.

For this purpose, the driveshaft 66 comprises two cylindrical bearing surfaces which are mounted so as to rotate in a cover 68 by means of two ball-bearings 70.

The cover 68 is, for example, a component made from moulded plastic comprising a central housing 72 which receives the crank and the big end of the connecting-rod 50 and which comprises two lateral wings 74 permitting it to be fixed onto the radial flange 22 of the first cylindrical armature.

The component 68 comprises a lower face 76 of circular outline so as to constitute a closure cover for the cylindrical armature 12.

In the embodiment illustrated in FIGS. 1 and 2, the connecting-rod and crank system is assembled in the following manner.

The body of the connecting-rod 50 is fixed to the push-rod 44 by means of the screw 60.

Moreover, the component 68 forming a cover is equipped with its first bearing bush rolling-contact 70 in which the corresponding cylindrical portion of the driveshaft 66 is inserted, which driveshaft is inserted axially in the direction Y—Y, from the right considering FIG. 1, into the housing 72 and through the inner race of the rolling-contact bearing 64.

The second bearing bush rolling-contact bearing 70 is then installed and held axially by a support ring 80 which is axially immobilised by a screw 82.

The assembly of the component 68 thus equipped is then installed on the flange 22 on which it may be axially clamped, for example, by threaded links (not shown).

There only remains to assemble the connecting-rod cap 56 onto the part 52 of the big end of the connecting-rod 50 by means of the screws 58.

As can be noted in FIG. 1, the driveshaft 66 comprises a first axial extremity 84 for the purpose of allowing it to be driven in rotation.

The opposite axial extremity 86 comprises positive location means here produced in the form of an axial slot 88 and of a flat 90.

The positive-location means 88, 90 permit the driveshaft 66 to be held in a specified angular position with respect to the component 68, for example by means of a positive-location key (not shown) inserted axially into the housing 72 and which, moreover, cooperates with corresponding indexing surfaces of the component 68, so that, when the drive extremity 84 is connected up to a drive member (not shown), a specified angular positioning of the driveshaft 66 is ensured.

The mode of operation of the hydroelastic support represented in FIGS. 1 and 2 will now be described with reference to FIG. 3.

The vibrations of the power plant 15 are transmitted to the body of the vehicle by means of the armature 12, the block of elastomer material 16 and the armature 14.

The force applied to the support can be broken down into two distinct forces.

Firstly, the force F1, also known as direct force, whose value depends on the stiffness K of the block of elastomer material 16.

Secondly, the force F2, which results from the action of the liquid contained in the working chamber 26 and whose value depends on the stiffness KP1 to support the pressure.

The eccentric crank pin 62 which is driven in rotation in a synchronous manner with regard to the rotation of the power plant, and especially with regard to the rotation of the crankshaft of the latter, transmits, by means of the connecting-rod 50, a perfectly synchronous force F3 whose magnitude is such that F3=F1+F2. The action of the connecting-rod and crank device thus has the effect of cancelling out all forces transmitted to the structure of the vehicle.

The block of elastomer material 16 behaves likes a pump and it is mounted compressed during the installation of the hydroelastic support.

The device which has just been described is designed to damp or to attenuate vehicle-body vibrations, as well as to prevent the transmission of vibrations coming from the engine so as to produce a more comfortable vehicle.

The well-known use of the passage 34 which interconnects the working chamber 26 and the expansion chamber 33 produces improved damping at the choppering frequency.

The action of the connecting-rod and crank assembly permits the application to the hydroelastic support of pressure forces from outside.

These pressure forces are synchronous with the second-order harmonics of the excitation vibrations coming from the power plant.

Pressure forces are thus injected into the working chamber of a hydroelastic support of the column-damping type in successive waves.

As was mentioned previously when referring to the diagram of FIG. 3, the resultant stiffness of the support is nil.

The driveshaft 66 of the eccentric 62, in order to be driven in rotation in synchronism with the power plant, is, for example, connected to a pulley directly driven by the power-plant timing belt, or by any other mechanism giving the same result, such as a gear train for example.

There will now be described the embodiment variant illustrated in FIG. 4.

According to a first characteristic of this variant, the connecting-rod 50 is produced as a single component moulded from plastic or cast from aluminium.

According to another characteristic of the variant illustrated in FIG. 4, the lower annular plate 28 comprises a central cup seal 92 which has a profile of revolution about the axis X—X in the form of a dome and which comprises a calibrated central hole 94.

The hole 94 could be replaced by a series of calibrated orifices.

This characteristic permits the hydroelastic support 10 to act on the vibrational modes arising above a rotational speed of 5000 revs/minute of the engine. Indeed, it sometimes becomes necessary to create excess tensions in a specific vibrational range.

For this purpose, the passage cross-section of the calibrated orifice 94 is matched so as to create the necessary excess tension according to the known general principle of column supports in which the length of the damping column is adjusted as a function of the resonance to be damped.

Thus a novel damping system has been created comprising a novel chamber 96 delimited by the cup seal 92 and by the movable diaphragm 30.

We claim:

1. Hydroelastic support (10) intended to be interposed between two assemblies to be suspended one with regard to the other, especially for the suspension of an engine in a motor vehicle, of the type comprising two armatures (12, 14) connected respectively to the two assemblies, these two armatures being joined by a block of elastomer material (16), the support comprising at least one working chamber (26) delimited at least in part by the block of elastomer material (16), and an expansion chamber (33), these two chambers being filled at least partially with liquid and connected together by a communication passage (34), and of the type in which the working chamber (26) is also delimited in part by a movable diaphragm (30) in elastic material and whose external face (42) comprises a push-rod (44) with which a drive device of the movable diaphragm (30) cooperates in order to apply to the latter displacements controlled in such a way as to create in the working chamber (26) pressure forces synchronous with the harmonics of the vibrations of one of the said two assemblies, characterised in that the drive device is of the connecting-rod (50) and crank (62, 66) type in which the small end (54) of the connecting-rod (50) is connected to the push-rod (44) and in which the shaft (66) for driving the crank (62) in rotation is mounted so as to turn in a bearing bush (70) fixed to one (12) of the two armatures.

2. Hydroelastic support according to claim 1, characterised in that the crank comprises an eccentric crank pin (62) mounted rotationally in the big end (52, 56) of the connecting-rod (50).

3. Hydroelastic support according to claim 2, characterised in that the eccentric crank pin (62) is mounted rotationally in a rolling-contact bearing (64) mounted clamped to the big end (52, 56) of the connecting-rod (50).

4. Hydroelastic support according to claim 1, characterised in that the push-rod (44) is fixed to the free extremity of the small end (54) of the connecting-rod (50).

5. Hydroelastic support as claimed in claim 1, characterised in that the push-rod (44) is produced integrally with the small end of the connecting-rod (50).

6. Hydroelastic support according to claim 1, characterised in that the big end of the connecting-rod (50) is produced in two parts (52, 56).

7. Hydroelastic support according to claim 1, characterised in that the connecting-rod (50) is produced as a single component by casting.

8. Hydroelastic support according to claim 1 characterised in that one extremity (86) of the shaft (66) for driving the crank (62) in rotation comprises means (88, 90) for positive location permitting its angular position to be determined for the purpose of connecting the driveshaft.

9. Hydroelastic support according to claim 1 characterised in that the said armature (12) is an armature of generally cylindrical form of which a first axial extremity (20) is connected to the block of elastomer material (16) and of which the second axial extremity (22) receives a closing cover (68) in which the bearing (70) for the shaft (66) for driving the crank (62) in rotation is arranged.

10. Hydroelastic support according to claim 9, characterised in that the second axial extremity (22) of the cylindrical armature (12) comprises a flange for fixing the hydroelastic support (10) to the said assembly, and in that the cover (68) comprises a radial flange (74) arranged facing the flange (22) of the armature (12) against which it is axially clamped.

11. Hydroelastic support according to claim 1 characterised in that the expansion chamber (33) is of generally annular form and delimits an internal housing in which the push-rod (44) is arranged.

12. Hydroelastic support according to claim 1 characterised in that the movable diaphragm (30) has substantially the form of a disc connected to the armature by its outer peripheral edge.

13. Hydroelastic support according to claim 12, characterised in that the peripheral edge (36) of the movable diaphragm (30) is mounted clamped in a sealed manner between the facing internal circular edges of two rigid annular plates (28, 32).

14. Hydroelastic support according to claim 13, characterised in that the annular plate (28) arranged axially on the side facing the block of elastomer material (16) comprises a part (92) which, in cross-section, has a profile of revolution and which extends from its internal circular edge towards the inside of the working chamber (26) and which comprises at least one calibrated passage orifice (94) for the liquid.

15. Hydroelastic support according to claim 14, characterised in that the said part of revolution (92) comprises a calibrated central orifice (94).

* * * * *